(12) United States Patent
Savino et al.

(10) Patent No.: US 8,455,679 B2
(45) Date of Patent: Jun. 4, 2013

(54) PREPOLYMER SYSTEMS HAVING REDUCED MONOMERIC ISOCYANATE CONTENTS

(75) Inventors: Thomas G. Savino, Northville, MI (US); Nikolay Lebedinski, West Bloomfield, MI (US); Rajesh Kumar, Riverview, MI (US); Calvin T. Peeler, Canton, MI (US)

(73) Assignee: BASF SE, Ludwigshafen (DE)

( * ) Notice: Subject to any disclaimer, the term of this patent is extended or adjusted under 35 U.S.C. 154(b) by 353 days.

(21) Appl. No.: 12/334,398

(22) Filed: Dec. 12, 2008

(65) Prior Publication Data

US 2010/0152381 A1 Jun. 17, 2010

(51) Int. Cl.
*C07C 249/00* (2006.01)
*C07C 291/00* (2006.01)

(52) U.S. Cl.
USPC ............... 560/359; 560/25; 560/26; 560/115; 560/330; 560/345; 560/351; 560/358; 252/182.22; 252/182.21; 252/182.2; 528/45; 528/49; 528/59; 528/69; 528/76; 528/80; 528/85

(58) Field of Classification Search
USPC ..... 528/49, 67, 56, 65; 521/170, 174; 560/25, 560/26, 330, 351, 358, 359; 252/182.2, 182.21, 252/182.22
See application file for complete search history.

(56) References Cited

U.S. PATENT DOCUMENTS

| | | | |
|---|---|---|---|
| 3,294,713 A | 12/1966 | Hudson et al. | |
| 3,384,623 A | 5/1968 | Inoue et al. | |
| 4,080,314 A | 3/1978 | Bonk et al. | |
| 4,292,350 A * | 9/1981 | Kubitza et al. | 427/385.5 |
| 4,383,070 A * | 5/1983 | Markusch et al. | 524/317 |
| 4,814,360 A | 3/1989 | McBrayer | |
| 4,855,490 A | 8/1989 | Markusch et al. | |
| 4,863,994 A | 9/1989 | Nelson et al. | |
| 4,910,332 A | 3/1990 | Kahl et al. | |
| 5,028,636 A | 7/1991 | Gebauer et al. | |
| 5,334,673 A * | 8/1994 | Wu | 473/378 |
| 5,367,036 A * | 11/1994 | Saito et al. | 525/458 |
| 5,817,860 A | 10/1998 | Rizk et al. | |
| 5,880,167 A * | 3/1999 | Krebs et al. | 521/155 |
| 5,889,065 A * | 3/1999 | Kirchmeyer et al. | 521/99 |
| 5,925,781 A * | 7/1999 | Pantone et al. | 560/26 |
| 5,968,995 A * | 10/1999 | Rizk et al. | 521/159 |
| 6,022,938 A | 2/2000 | Bruchmann et al. | |
| 6,051,622 A | 4/2000 | Kinkelaar et al. | |
| 6,391,935 B1 | 5/2002 | Hager et al. | |
| 6,713,570 B2 * | 3/2004 | Tangen | 525/458 |
| 6,914,117 B2 | 7/2005 | Bleys et al. | |
| 7,148,287 B2 * | 12/2006 | Gupta | 524/871 |
| 2004/0014847 A1 * | 1/2004 | Bolte et al. | 524/59 |
| 2008/0119629 A1 * | 5/2008 | Ohwada et al. | 528/53 |

FOREIGN PATENT DOCUMENTS

WO 96/06124 A1 2/1996

* cited by examiner

*Primary Examiner* — Michael L Leonard
(74) *Attorney, Agent, or Firm* — Howard & Howard Attorneys PLLC.

(57) ABSTRACT

A prepolymer system has a monomeric isocyanate content of no greater than about 10% by weight based on 100 parts by weight of the prepolymer system. The prepolymer system comprises a diluent component and a prepolymer component different than and separate from the diluent component. The diluent component has an excess of isocyanate (NCO) functional groups, and comprises the reaction product of a monohydric isocyanate-reactive component and an excess of a first isocyanate component. The first isocyanate component comprises monomeric isocyanates reactive with the monohydric isocyanate-reactive component. The prepolymer component also has an excess of NCO functional groups, and comprises the reaction product of a polyol component and an excess of a second isocyanate component. The prepolymer system can be used to prepare foams via reaction with water. The foams have low density and have excellent adhesion and sound dampening properties for use in cavities of automobile bodies.

43 Claims, No Drawings

PREPOLYMER SYSTEMS HAVING REDUCED MONOMERIC ISOCYANATE CONTENTS

FIELD OF THE INVENTION

The present invention generally relates to prepolymer systems, and more specifically, to prepolymer systems having reduced monomeric isocyanate contents, and to methods of preparing prepolymer compositions from the prepolymer systems.

DESCRIPTION OF THE RELATED ART

Polyurethanes are formed by the reaction of an isocyanate, such as diphenylmethane diisocyanate (MDI), with an isocyanate-reactive compound, such as a polyol. Generally, streams of approximately equal volume of the isocyanate and the polyol are mixed in a mixing-head to form a reaction mixture, and then the reaction mixture is dispensed into a cavity or mold. In the reaction mixture, hydroxyl (OH) functional groups of the polyol and isocyanate (NCO) functional groups of the isocyanate react to form the polyurethane. To form polyurethane foams, specifically, water-blown polyurethane foams, water is generally added to the polyol prior to reaction with the isocyanate (or added as a third distinct component during reaction). Once the isocyanate, polyol, and water are mixed, the OH functional groups of the polyol and the NCO functional groups of the isocyanate react to form a reaction mixture, and the water reacts with other NCO functional groups of the isocyanate (or another isocyanate present) to generate carbon dioxide ($CO_2$) gas in situ in the reaction mixture, which causes the reaction mixture to foam while the reaction mixture reacts to form the polyurethane.

Prepolymers have been used in place of isocyanates to decrease an amount of vaporous isocyanate when making polyurethane foams. Since isocyanates readily react with water, they are generally known to be an irritant when inhaled. Prepolymers are generally made by reacting a diol (or a triol) with a diisocyanate, e.g. a polymeric MDI (PMDI), at an excess of NCO functional groups of the diisocyanate relative to OH functional groups of the diol (or the triol). An excess of NCO functional groups is used to insure that the prepolymer can provide enough NCO functional groups to produce foam formed from the prepolymer, such as during a subsequent reaction of the prepolymer with another polyol.

Unfortunately, since an excess of diisocyanate is employed to form the prepolymer, typically, a significant amount of monomeric isocyanate, e.g. monomeric MDI, is still present in the prepolymer. As such, industrial hygiene problems can arise when such monomeric isocyanates are present. Generally, monomeric isocyanates are vaporous, due to their increased volatility relative to polymeric isocyanates. As described above, isocyanates are generally known to be an irritant when inhaled. Therefore, expensive air-handling systems must be employed to remedy such vaporous isocyanate problems, such as by using hoods or protective breathing apparatuses during use of the prepolymer to form foams.

Due to gellation problems experienced during use of certain prepolymers (e.g. stability issues with the prepolymers increasing in viscosity over time), it has been proposed in the art to use a monohydric alcohol simultaneously with an organic polyisocyanate and a polyol to form a prepolymer composition. The prepolymer composition, prepared in such a manner, seemingly avoids gellation while providing sufficient amounts of NCO functional groups to form foam in situ via reaction with water, as described above. Unfortunately, the simultaneous reaction of the monohydric alcohol, the organic polyisocyanate, and the polyol, all at once, can lead to unpredictable viscosities in the prepolymer composition, due in part to unpredictable reaction products and amounts thereof formed during reaction of the three components. If the resultant viscosity of the prepolymer composition is higher than desired, alternate prepolymer formulations and compositions must be prepared to achieve desired viscosities. The viscosity of the prepolymer composition cannot simply be reduced by the addition of an additive component, such as a plasticizer, because such an addition would reduce the NCO content of the final prepolymer composition, which is undesirable since adequate NCO content is necessary to ensure adequate foaming when the prepolymer composition is reacted with water to form water-blown polyurethane foams. The only solution to reducing the viscosity of the prepolymer composition would be to adjust the formulation and prepare a second prepolymer composition with the hope of attaining the desired viscosity.

In view of the foregoing, there remains an opportunity to provide prepolymer systems with low monomeric isocyanate content, low viscosity, and sufficient NCO content for use in preparing articles, such as water-blown polyurethane foams. There also remains an opportunity to provide prepolymer systems that provide prepolymer compositions with increased formulation flexibility, and that provide the ability to easily adjust final properties of the prepolymer compositions and articles formed therefrom. There also remains an opportunity to provide improved foamed articles employing such prepolymer systems and prepolymer compositions and methods of forming the same.

SUMMARY OF THE INVENTION AND ADVANTAGES

A prepolymer system of the present invention has a monomeric isocyanate content of no greater than about 10% by weight based on 100 parts by weight of the prepolymer system. The prepolymer system comprises a diluent component and a prepolymer component different than and separate from the diluent component. The diluent component has an excess of isocyanate functional groups. The diluent component comprises the reaction product of a monohydric isocyanate-reactive component and an excess of a first isocyanate component relative to the monohydric isocyanate-reactive component. The first isocyanate component comprises monomeric isocyanates reactive with the monohydric isocyanate-reactive component and has at least two isocyanate functional groups reactive with the monohydric isocyanate-reactive component. The prepolymer component also has an excess of isocyanate functional groups. The prepolymer component comprises the reaction product of a polyol component having at least two hydroxyl functional groups and an excess of a second isocyanate component relative to the polyol component. The second isocyanate component has at least two isocyanate functional groups reactive with the polyol component.

The components of the prepolymer system have excellent storage stability and low monomeric isocyanate contents, i.e., a monomeric isocyanate content of no greater than 10% by weight based on 100 parts by weight of the prepolymer system. The prepolymer system provides for increased formulation flexibility of the prepolymer compositions and foamed articles formed therefrom, and allows for increased control in final properties of prepolymer compositions and foamed articles. Specifically, by employing the individual components of the prepolymer system, one using the prepolymer system to form prepolymer compositions and foamed articles can better control, predict, and obtain final properties of the prepolymer compositions and foamed articles, by tailoring the amounts of each of the components of the prepolymer system employed for forming the prepolymer compositions and foamed articles. Such prepolymer compositions formed from the prepolymer systems of the present invention have low monomeric isocyanate contents and other desirable properties, such as sufficient isocyanate (NCO) functional group content for subsequent reaction. Further, such prepolymer compositions have desirable viscosity profiles, which can provide energy savings. One employing the prepolymer system can also tailor order of addition of the individual components and the amounts of the components employed to form foamed articles, for preventing undesired side-reactions during formation of foamed articles and for preventing uncertainty in final properties of foamed articles. Such foamed articles formed from the prepolymer system of the present invention are generally low in density and have excellent adhesion and cavity-filling flow properties. Such properties are generally desirable for various uses, such as for use in filling cavities of automobile bodies for reducing road noise.

DETAILED DESCRIPTION OF THE INVENTION

The present invention provides a prepolymer system. The prepolymer system comprises a diluent component, which can also be referred to herein as a "reactive diluent" component or a "reducer" component. The diluent component has an excess of isocyanate (NCO) functional groups. Specifically, the diluent component provides additional NCO functional group content for the prepolymer system for subsequent reactions of the prepolymer system. For example, the prepolymer system can be used to form a prepolymer composition, which itself can be used to form foam, such as polyurethane foam, polyisocyanurate foam, polyurea foam, or a hybrid of two or more of these foams. The diluent component can also be employed to vary viscosity of the prepolymer composition formed from the prepolymer system. In other words, the diluent component can impart NCO functional groups to the prepolymer composition while reducing the viscosity of the prepolymer composition, which is useful for various application techniques, such as spraying or atomizing the prepolymer composition. Generally, the diluent component at least maintains viscosity of the prepolymer composition, or preferably decreases viscosity of the prepolymer composition. The diluent component should also contain an adequate quantity of NCO functional groups, such that when combined with a prepolymer component (described further below) to form the prepolymer system, the NCO functional group content of the prepolymer system is high enough to allow for good foam formation when the prepolymer system is combined with water. The diluent component should also contain a low amount of unreacted monomeric isocyanate (also described further below), such that when combined with the prepolymer component, the resulting monomeric isocyanate content of the prepolymer system is also low. Thus, it is believed that some of the advantages that the diluent component affords the prepolymer system include imparting lower viscosity, adequate NCO functional group content, and lower monomeric isocyanate content. These and other uses of the prepolymer system, and methods of forming the prepolymer system, prepolymer compositions, and foamed articles, and other benefits of the diluent component, are further described below.

The diluent component comprises the reaction product of a monohydric isocyanate-reactive component and an excess of a first isocyanate component relative to the monohydric isocyanate-reactive component. In certain embodiments, the diluent component consists essentially of the reaction product of the monohydric isocyanate-reactive component and the first isocyanate component. In other embodiments, the diluent component consists of the reaction product of the monohydric isocyanate-reactive component and the first isocyanate component.

The monohydric isocyanate-reactive component can be selected from various compounds having only one hydroxyl (OH) functional group. Typically, the monohydric isocyanate-reactive component comprises an alcohol; however, other compounds that are monohydric and isocyanate-reactive can also be used, such as 3,5-dimethylpyrazole, e-caprolactam, oximes, and other isocyanate blocking agents in the art. In certain embodiments, the monohydric isocyanate-reactive component may be commonly referred to in the art as a mono-alcohol, monoalcohol, mono-ol, monool, mon-ol, or monol. The OH functional group of the monohydric isocyanate-reactive component is reactive with an NCO functional group of the first isocyanate component. The first isocyanate component has at least two NCO functional groups, i.e., the first isocyanate component has two or more NCO functional groups. For example, in embodiments described further below, the first isocyanate component can comprise a diisocyanate having two NCO functional groups and/or a polyisocyanate having three or more NCO functional groups.

As appreciated by those skilled in the art, when the monohydric isocyanate-reactive component and the first isocyanate component are introduced under reaction conditions, e.g. in a reaction vessel, the OH functional group of the monohydric isocyanate-reactive component will react with one of the NCO functional groups of the first isocyanate component to form a urethane linkage. An example of forming the diluent component by the reaction of the respective NCO and OH functional groups of the first isocyanate component and the monohydric isocyanate-reactive component is illustrated by simplified Reaction Scheme (I) below.

Reaction Scheme (I):

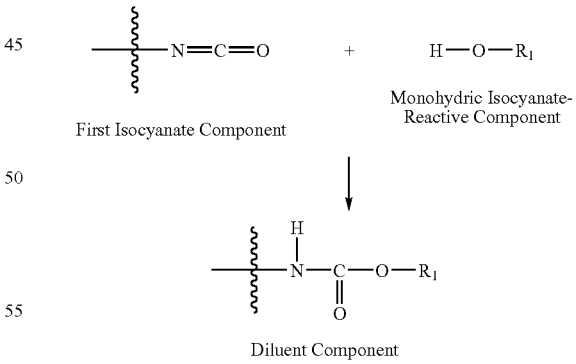

wherein $R_1$ is typically an organic group, as better appreciated by reference to the description below.

The monohydric isocyanate-reactive component can be selected from the group of conventional monohydric alcohols, such as branched and unbranched aliphatic, cycloaliphatic, and aromatic alcohols. In these embodiments, the monohydric isocyanate-reactive component typically has from 1 to 20, more typically from 1 to 16, yet more typically from 1 to 12, and most typically from 1 to 8 carbon atoms.

Examples of suitable aliphatic alcohols, for purposes of the present invention include, but are not limited to, methanol, ethanol, propanol, isopropanol, butanol, sec-butanol, isobutanol, tert-butanol, and the various isomers of pentyl alcohol, of hexyl alcohol, of octyl alcohol (e.g. 2-ethylhexanol), of nonyl alcohol, of decyl alcohol (e.g. 2-propylheptanol), of lauryl alcohol, of myristyl alcohol, of cetyl alcohol and of stearyl alcohol, as well as the fatty alcohols and wax alcohols which occur naturally or which can be obtained by the hydrogenation of naturally occurring carboxylic acids. Cyclohexanol and its homologues are examples of suitable cycloaliphatic alcohols, for purposes of the present invention. Further, aromatic hydroxyl compounds, such as phenol, cresol, thymol, carvacrol, benzyl alcohol and phenylethanol, can also be employed. Particularly useful monohydric alcohols, for purposes of the present invention, include those which provide for a diluent component having low viscosity and a high NCO content, such as monohydric alcohols having carbon chain lengths between about 4 and 10 carbons. In one embodiment, the monohydric isocyanate-reactive component is 2-ethylhexanol. In other embodiments, the monohydric isocyanate-reactive component is butanol, such as n-butanol.

In certain embodiments, the monohydric isocyanate-reactive component is a polyoxyalkylene monool. Examples of suitable polyoxyalkylene monools, for purposes of the present invention, include, but are not limited to, polyoxypropylene monools, polyoxyethylene monools, polyoxyethylene polyoxypropylene monools, and combinations thereof. The aforementioned polyoxyalkylene monools can be made by the alkoxylation of a monohydric alcohol, such as one or more of the monohydric alcohols described and exemplified above. Methods of alkoxylating alcohols are well known to those skilled in the art.

In certain embodiments, the monohydric isocyanate-reactive component may include another functional group (or groups) in addition to the OH functional group. Such functional groups, if present, essentially fail to react with the first isocyanate component under the reaction conditions employed for forming the urethane linkage, i.e., the reaction to form the diluent component. These additional functional groups, if present, may be useful for subsequently reacting the diluent component of the prepolymer system with other reagents, if necessary or so desired. It is to be appreciated that the monohydric isocyanate-reactive component may include any combination of two or more of the aforementioned alcohols and/or polyoxyalkylene monools.

Generally, the monohydric isocyanate-reactive component can be included in the diluent component in various amounts, depending on, for example, the amount of NCO functional groups desired to be present in the diluent component. However, the monohydric isocyanate-reactive component must be employed in an amount less than the first isocyanate component, based on a stoichiometric ratio of OH functional groups (of the monohydric isocyanate-reactive component) to NCO functional groups (of the first isocyanate component). Employing too much of the monohydric isocyanate-reactive component will cause most, if not all of the NCO functional groups of the first isocyanate group to be reacted, thus not allowing the diluent component to provide any free NCO functional groups for subsequent reaction of the prepolymer composition formed from the prepolymer system, i.e., the diluent component will not have the excess of NCO functional groups to impart to the prepolymer system. Alternatively, if too little of the monohydric isocyanate-reactive component is employed, based on a stoichiometric ratio of OH functional groups to NCO functional groups, a monomeric isocyanate content of the diluent component will generally be too high. The monomeric isocyanate content of the diluent component is further described below.

In certain embodiments, the monohydric isocyanate-reactive component is typically present in an amount of from about 5 to about 30, more typically from about 5 to about 25, yet more typically from about 10 to about 20, and most typically from about 10 to about 15, parts by weight, based on 100 parts by weight of the diluent component.

As introduced above, the first isocyanate component has at least two NCO functional groups, which are reactive with the monohydric isocyanate-reactive component under reaction conditions. The first isocyanate component may commonly be referred to in the art as a diisocyanate (i.e., an isocyanate having two NCO functional groups) or a polyisocyanate (i.e., an isocyanate having three or more NCO functional groups). Suitable isocyanates, for purposes of the present invention include, but are not limited to, conventional isocyanates, such as aliphatic, cycloaliphatic, araliphatic, aromatic and polymeric isocyanates. In certain embodiments, the first isocyanate component comprises a polymeric diphenylmethane diisocyanate (PMDI), which is also referred to in the art as polymethylene polyphenylene polyisocyanate. Other suitable isocyanates, for purposes of the present invention include, but are not limited to, diphenylmethane diisocyanates (MDI), toluene diisocyanates (TDI), hexamethylene diisocyanates (HMDI), isophorone diisocyanates (IPDI), naphthalene diisocyanates (NDI), and combinations thereof.

Specific examples of suitable isocyanates, for purposes of the present invention, are commercially available from BASF Corporation of Florham Park, N.J., under the trademark of LUPRANATE®, such as LUPRANATE® M70L, LUPRANATE® M70R, LUPRANATE® M20, and LUPRANATE® M200 isocyanates. It is to be appreciated that the first isocyanate component may include any combination of two or more of the aforementioned isocyanates.

Generally, the first isocyanate component can be included in the diluent component in various amounts, depending on, for example, the amount of NCO functional groups desired to be present in the diluent component. However, an excess of the first isocyanate relative to the monohydric isocyanate-reactive component must be employed, based on a stoichiometric ratio of NCO functional groups (of the first isocyanate component) to OH functional groups (of the monohydric isocyanate-reactive component). Employing too little of the first isocyanate component will cause most, if not all of the NCO functional groups of the first isocyanate component to be reacted (with the monohydric isocyanate-reactive component), thus not allowing the diluent component to provide any free NCO functional groups for subsequent reaction of the prepolymer composition formed from the prepolymer system. Alternatively, if too much of the first isocyanate component is employed, based on a stoichiometric ratio of NCO functional groups to OH functional groups, the monomeric isocyanate content of the diluent component will generally be too high.

In certain embodiments, the first isocyanate component is typically present in an amount of from about 50 to about 90, more typically from about 50 to about 80, yet more typically from about 50 to about 70, and most typically from about 50 to about 60, parts by weight, based on 100 parts by weight of the diluent component.

As alluded to above, the first isocyanate component comprises monomeric isocyanates, such as monomeric MDI (e.g. 2,4'-MDI and/or 4,4'-MDI), depending on the isocyanate (or isocyanates) employed. Specifically, as understood by those skilled in the art, isocyanates designated as "polymeric isocyanates", such as PMDI, are typically not purely polymeric, but rather, such polymeric isocyanates include a combination of isocyanate polymers (comprised of two or more polymerized isocyanate monomers) and free isocyanate monomers (also known in the art as residual monomeric isocyanates). As such, the polymeric isocyanates have both a polymeric isocyanate content and a monomeric isocyanate content. For example, if a PMDI is employed as the first isocyanate component, the PMDI typically includes a combination of polymeric MDI and monomeric MDI, and in some instances, other mixed isomers. Such isocyanate monomers, when present in the first isocyanate component, establish a monomeric isocyanate content of the first isocyanate component.

In certain embodiments, as described above, the first isocyanate component is PMDI. In these embodiments, the first isocyanate component typically has a monomeric isocyanate content, i.e., a monomeric MDI content, of greater than about 20%, more typically from about 20% to about 50%, yet more typically from about 25% to about 45%, and most typically from about 25% to about 35%, by weight, based on 100 parts by weight of the first isocyanate component. In these embodiments, the remainder of the first isocyanate component can comprise polymeric MDI and, in some instances, other mixed isomers. In one embodiment, the first isocyanate component has a monomeric isocyanate content ranging from about 28% to about 33% by weight based on 100 parts by weight of the first isocyanate component. It is to be appreciated that the monomeric isocyanate contents described above are for the first isocyanate component, and therefore, such contents are present prior to reaction with the monohydric isocyanate-reactive component to form the diluent component.

To prepare the diluent component, the monohydric isocyanate-reactive component and first isocyanate component are combined, for example, in a reaction vessel. Heat and/or agitation can be employed to expedite reaction in the reaction vessel. Methods of forming the diluent component are further described below. After the monohydric isocyanate-reactive component and the first isocyanate component react to form the diluent component, the diluent component has a monomeric isocyanate content of no greater than about 10%, more typically no greater than 7.5%, and most typically no greater then 5%, by weight, based on 100 parts by weight of the diluent component. In certain embodiments, the diluent component has a monomeric isocyanate content of from about 1% to about 10%, more typically from about 1% to about 7.5%, yet more typically from about 1% to about 5%, and most typically about 3%, by weight, based on 100 parts by weight of the diluent component. Generally, increasing an amount of the monohydric isocyanate-reactive component relative to the first isocyanate component, based on a stoichiometric ratio of OH functional groups to NCO functional groups, decreases the monomeric isocyanate content of the diluent component.

The aforementioned monomeric isocyanate contents are achieved by the monohydric isocyanate-reactive component reacting with the isocyanate monomers present in the first isocyanate component, thus "binding-up" or "scavenging" the isocyanate monomers to reduce the monomeric isocyanate content of the first isocyanate component, and therefore, reduce the monomeric isocyanate content of the diluent component. An example of such binding-up of a monomeric isocyanate can be represented by the reaction illustrated in Reaction Scheme (I) above. Lowering the monomeric isocyanate content is useful for remedying industrial hygiene concerns during use of the diluent component, specifically, by reducing vaporous (i.e., volatile) monomeric isocyanate content in a surrounding airspace, such as the surrounding airspace present during use of the prepolymer composition formed from the prepolymer system for manufacture of a foam, e.g. polyurethane foam. Specifically, binding-up the isocyanate monomers increases their molecular weight (by attaching them to the monohydric isocyanate-reactive component), thereby decreasing their volatility.

The diluent component has an excess of NCO functional groups. Various amounts of the monohydric isocyanate-reactive component and the first isocyanate component can be employed to control the NCO content of the diluent component. Typically, the diluent component has an NCO content of from about 1% to about 25%, more typically from about 2% to about 15%, and most typically from about 3% to about 10%, by weight, based on 100 parts by weight of the diluent component.

It is to be appreciated that a portion of the NCO functional groups of the first isocyanate component may be completely reacted with the monohydric isocyanate-reactive component. For example, each of the two NCO functional groups of a single diisocyanate molecule may each be individually reacted with a single monohydric isocyanate-reactive component molecule. Further, other portions of the NCO functional groups of the first isocyanate component may only be partially reacted with the monohydric isocyanate-reactive component. For example, one of the two NCO functional groups of a single diisocyanate molecule may be reacted with a single monohydric isocyanate-reactive component molecule while the other NCO functional group is left unreacted (or free) due to an insufficient amount of the monohydric isocyanate-reactive component being present during formation of the diluent component, thus the unreacted NCO functional group provides for the NCO content of the diluent component, as previously described. Yet further, some portions of the NCO functional groups of the first isocyanate component may be left unreacted altogether. For example, both of the two NCO functional groups of a single diisocyanate molecule may be left unreacted due to an insufficient amount of the monohydric isocyanate-reactive component being present during formation of the diluent component, thus both of the unreacted NCO functional groups provide for the NCO content of the diluent component. Controlling such reactions, and therefore amounts and distributions of the NCO functional groups present in the diluent component, can be controlled by various methods known in the art. For example, distributions of the NCO functional groups present in the diluent component can be controlled by controlling feeds of the respective components, by letting down a prior reaction product with an excess of one of the components, etc.

When the prepolymer system is employed to form the prepolymer composition, the diluent component can be present in the prepolymer composition in various amounts depending, for example, on a desired NCO content of the prepolymer composition for subsequent reaction of the prepolymer composition. Further, the amount of the diluent component employed to form the prepolymer composition can also alter the monomeric isocyanate content of the prepolymer composition by a dilution effect. Typically, the diluent component is present in an amount of from about 30 to about 70, more typically from about 35 to about 65, yet more typically from about 40 to about 60, most typically from about 50 to about 60, and yet most typically about 60, parts by weight, based on 100 parts by weight of the prepolymer composition.

The diluent component can have various viscosities, depending on the specific monohydric isocyanate-reactive and first isocyanate components, and amounts thereof, employed to form the diluent component. Typically, the diluent component has a viscosity of no greater than 3,000, more typically from about 200 to about 3,000, yet more typically from about 200 to about 2,000, most typically from about 500 to about 1,500, and yet most typically from about 800 to about 1,000, centipoise (cP) at 25° C., according to ASTM D2196. In certain embodiments, the diluent component has a viscosity ranging from about 850 to about 950 cP at 25° C.

Without being bound or limited by any particular theory, it is believed that viscosity build of the diluent component is prevented since a majority of the monohydric isocyanate-reactive component preferentially reacts with the isocyanate monomers present in the first isocyanate component. In addition, if and when a portion of the monohydric isocyanate-reactive component reacts with NCO functional groups of higher oligomers present in the first isocyanate component, such oligomers are merely capped, since the monohydric isocyanate-reactive component cannot serve as a cross-linker between two or more NCO functional groups.

In certain embodiments, the diluent component further comprises a plasticizer component. If employed, the plasticizer component is useful for reducing the viscosity and NCO content of the diluent component. Suitable plasticizers, for purposes of the present invention, are described in detail further below. In certain embodiments, the plasticizer component is present in an amount of from about 20 to about 50, more typically from about 25 to about 45, yet more typically from about 30 to about 40, and most typically from about 35 to about 40, parts by weight, based on 100 parts by weight of the diluent component. If employed, the plasticizer component is typically present during preparation of the diluent component (e.g. in the reaction vessel), and/or added to the diluent component after formation.

As introduced above, the prepolymer system further comprises a prepolymer component different than and separate from the diluent component. The prepolymer component comprises the reaction product of a polyol component and a second isocyanate component. Unlike the monohydric isocyanate-reactive component, the polyol component has at least two OH functional groups. The OH functional groups of the polyol component are reactive with the NCO functional groups of the second isocyanate component.

As understood by those skilled in the art, when the polyol component and the second isocyanate component are introduced under reaction conditions, e.g. in a reaction vessel, one of the OH functional groups of the polyol component will react with one of the NCO functional groups of the second isocyanate component to form a urethane linkage. An example of forming the prepolymer component by the reaction of the NCO and OH functional groups of the second isocyanate component and the prepolymer, respectively, is illustrated below by simplified Reaction Scheme (II).

Reaction Scheme (II):

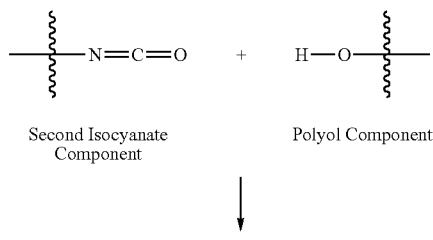

Second Isocyanate Component    Polyol Component

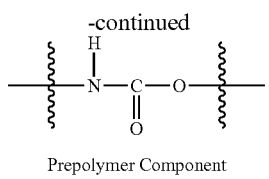

Prepolymer Component

The polyol component is typically selected from the group of conventional polyols, such as ethylene glycol, diethylene glycol, propylene glycol, dipropylene glycol, butane diol, glycerol, trimethylolpropane, triethanolamine, pentaerythritol, sorbitol, and combinations thereof. Other suitable polyols include, but are not limited to, biopolyols, such as soybean oil, castor-oil, soy-protein, rapeseed oil, etc., and combinations thereof.

Suitable polyether polyols, for purposes of the present invention include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols, for purposes of the present invention include, but are not limited to, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramides polyols, for purposes of the present invention, may be obtained by the inclusion of aminoalcohols such as ethanolamine in polyesterification mixtures. Suitable polythioether polyols, for purposes of the present invention, include products obtained by condensing thiodiglycol either alone or with other glycols, alkylene oxides, dicarboxylic acids, formaldehyde, aminoalcohols or aminocarboxylic acids. Suitable polycarbonate polyols, for purposes of the present invention, include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols, for purposes of the present invention, include those prepared by reacting glycols such as diethylene glycol, triethylene glycol or hexanediol with formaldehyde. Other suitable polyacetal polyols may also be prepared by polymerizing cyclic acetals. Suitable polyolefin polyols, for purposes of the present invention, include hydroxy-terminated butadiene homo- and copolymers and suitable polysiloxane polyols include polydimethylsiloxane diols and triols.

In certain embodiments, the prepolymer component typically has a nominal molecular weight of from about 300 to about 5,000, more typically from about 300 to about 4,000, and most typically from about 400 to about 1,000. In one embodiment, the prepolymer component comprises a polypropylene glycol formed by adding propylene oxide to a propylene glycol nucleus, the polypropylene glycol having a nominal molecular weight of about 700. In another embodiment, the prepolymer component comprises a polypropylene glycol formed by adding propylene oxide to a propylene glycol nucleus, the polypropylene glycol having a nominal molecular weight of about 1,000. In yet another embodiment, the prepolymer component comprises a polypropylene glycol formed by adding propylene oxide to a propylene glycol nucleus, the polypropylene glycol having a nominal molecular weight of about 400.

Specific examples of suitable polyols, for purposes of the present invention, are commercially available from BASF Corporation under the trademark of PLURACOL®, such as PLURACOL® P100R, PLURACOL® P410R, PLURACOL® P710R, PLURACOL® P1010, PLURACOL® P2010, and PLURACOL® 1044 polyols. It is to be appreciated that the prepolymer component may include any combination of two or more of the aforementioned polyols.

Generally, the polyol component can be included in the prepolymer component in various amounts, depending on, for example, the amount of NCO functional groups desired to be present in prepolymer component. However, the polyol component must be employed in an amount less than the second isocyanate component, based on a stoichiometric ratio of OH functional groups (of the polyol component) to NCO functional groups (of the second isocyanate component). Employing too much of the polyol component will cause most, if not all of the NCO functional groups of the second isocyanate component to be reacted, thus not allowing the prepolymer component to provide any free NCO functional groups for subsequent reactions of the prepolymer composition formed from the prepolymer system. Alternatively, if too little of the polyol component is employed, the monomeric isocyanate content of the prepolymer component may be too high.

In certain embodiments, the polyol component is present in an amount of from about 5 to about 50, more typically from about 5 to about 40, yet more typically from about 5 to about 30, most typically from about 5 to about 20, and yet most typically from about 5 to about 10, parts by weight, based on 100 parts by weight of the prepolymer component.

The second isocyanate component has at least two NCO functional groups. The second isocyanate component may be the same as or different than the first isocyanate component. Accordingly, suitable isocyanates, for use as the second isocyanate component, are as described and exemplified above with description of the first isocyanate component. In certain embodiments, the second isocyanate component is PMDI. Generally, in these embodiments, the prepolymer component can be classified as a "MDI-based" prepolymer component. In specific embodiments, both the first and second isocyanate components are PMDI. As such, in these embodiments, the prepolymer composition formed from the prepolymer system can be classified as a MDI-based prepolymer composition. It is to be appreciated that the second isocyanate component may include any combination of two or more of the aforementioned isocyanates.

Generally, the second isocyanate component can be included in the prepolymer component in various amounts, depending on, for example, the amount of NCO functional groups desired to be present in prepolymer component. However, an excess of the second isocyanate relative to the polyol component must be employed, based on a stoichiometric ratio of NCO functional groups (of the second isocyanate component) to OH functional groups (of the polyol component). Employing too little of the second isocyanate component will cause most, if not all of the NCO functional groups of the second isocyanate component to be reacted (with the polyol component), thus not allowing the prepolymer component to provide any free NCO functional groups for subsequent reactions of the prepolymer composition formed from the prepolymer system. Alternatively, if too much of the second isocyanate component is employed, the monomeric isocyanate content of the prepolymer component may be too high.

In certain embodiments, the second isocyanate component is present in an amount of from about 25 to about 60, more typically from about 35 to about 60, yet more typically from about 45 to about 60, and most typically from about 50 to about 55, parts by weight, based on 100 parts by weight of the prepolymer component.

In certain embodiments, the second isocyanate component comprises inherent isocyanate monomers, as described above with the first isocyanate component, depending on the isocyanate (or isocyanates) employed. Such isocyanate monomers, if present in the second isocyanate component, establish the monomeric isocyanate content of the second isocyanate component. In the aforementioned embodiments, the second isocyanate component typically has a monomeric isocyanate content, e.g. a monomeric MDI content, of greater than about 20%, more typically from about 20% to about 50%, and most typically from about 25% to about 45%, by weight, based on 100 parts by weight of the second isocyanate component. In these embodiments, the remainder of the second isocyanate component can comprise polymeric-isocyanates, e.g. polymeric-MDI, and, in some instances, other mixed isomers. It is to be appreciated that the monomeric isocyanate contents described above are for the second isocyanate component, and therefore, the monomeric isocyanate contents of the second isocyanate component are present prior to reaction with the polyol component to form the prepolymer component.

To prepare the prepolymer component (separate than the diluent component), the polyol component and second isocyanate component are combined, for example, in a reaction vessel. Heat and/or agitation can be employed to expedite reaction in the reaction vessel. Methods of forming the prepolymer component are further described below. After the polyol component and the second isocyanate component react to form the prepolymer component, the prepolymer component typically has a monomeric isocyanate content of no greater than about 10%, more typically no greater than 7.5%, and most typically no greater then 5%, by weight, based on 100 parts by weight of the prepolymer component. In certain embodiments, the prepolymer component typically has a monomeric isocyanate content of from about 1% to about 20%, more typically from about 1% to about 10%, and most typically from about 1% to about 5%, based on 100 parts by weight of the prepolymer component. Generally, increasing an amount of the polyol component relative to the second isocyanate component decreases the monomeric isocyanate content of the prepolymer component.

The aforementioned monomeric isocyanate contents are achieved by the polyol component reacting with the isocyanate monomers, if present in the second isocyanate component, thus "binding-up" the isocyanate monomers to reduce the monomeric isocyanate content of the second isocyanate component, and therefore, reduce the monomeric isocyanate content of the prepolymer component. As described above with the diluent component, lowering the monomeric isocyanate content is useful for remedying industrial hygiene concerns during use of the prepolymer component, such as by reducing an amount of volatile monomeric isocyanates.

In other embodiments, the prepolymer component can comprise a conventional prepolymer as known in the art. Specific examples of suitable prepolymers, for purposes of the present invention, are commercially available from the BASF Corporation under the trademark of LUPRANATE®, such as, LUPRANATE® 279, LUPRANATE® 5020, LUPRANATE® 5030, LUPRANATE® 5060, LUPRANATE® 5070 and LUPRANATE® 5080 isocyanates.

Other suitable prepolymers, for purposes of the present invention, (and methods of preparing the same) are described in U.S. Pat. No. 4,108,508 to Narayan et al.; U.S. Pat. No. 4,108,509 to Narayan et al.; U.S. Pat. No. 4,125,489 to Narayan et al.; U.S. Pat. No. 4,163,086 to Narayan et al.; U.S. Pat. No. 4,263,412 to Pauls; U.S. Pat. No. 5,436,277 to Narayan et al.; U.S. Pat. No. 5,459,221 to Narayan et al.; U.S. Pat. No. 5,491,251 to Narayan et al.; U.S. Pat. No. 5,491,252 to Narayan et al.; U.S. Pat. No. 5,530,034 to Narayan et al.; U.S. Pat. No. 5,537,010 to Narayan et al.; U.S. Pat. No. 5,658,959 to Voloppi et al.; U.S. Pat. No. 5,872,193 to Narayan et al.; U.S. Pat. No. 6,077,456 to Narayan; U.S. Pat. No. 6,090,864 to Narayan et al.; U.S. Pat. No. 6,262,139 to Narayan et al.; U.S. Pat. No. 6,495,652 to Reichelt et al.; and U.S. Pat. No. 7,208,531 to Neff et al., the disclosures of which pertaining to prepolymers are incorporated by reference in their entirety.

The prepolymer component has an excess of NCO functional groups. Various amounts of the polyol component and the second isocyanate component can be employed to control the NCO content of the prepolymer component. Typically, the prepolymer component has an NCO content of from about 1% to about 30%, more typically from about 5% to about 20%, and most typically from about 5% to about 18%, by weight, based on 100 parts by weight of the prepolymer component.

Various amounts of the polyol component and the second isocyanate component can be employed to control the NCO content of the prepolymer component, as further described below. Further, similar to description of the first isocyanate component above, it is to be appreciated that a portion of the NCO functional groups of the second isocyanate component may be completely reacted, may be partially reacted, and/or may be completely unreacted, with the polyol component. Yet further, distributions and amounts of the NCO functional groups present in the prepolymer component can be controlled by controlling feeds of the respective components, by letting down a prior reaction product with an excess of one of the components, etc.

When the prepolymer system is employed to form the prepolymer composition, the prepolymer component can be present in the prepolymer composition in various amounts depending, for example, on a desired NCO content for subsequent reactions of the prepolymer composition. Typically, the prepolymer component is present in an amount of from about 30 to about 70, more typically from about 30 to about 60, yet more typically from about 40 to about 60, most typically from about 40 to about 60, and yet most typically about 40, parts by weight, based on 100 parts by weight of the prepolymer composition.

The prepolymer component can have various viscosities, depending on the specific polyol component and second isocyanate component, and amounts thereof, employed to form the prepolymer component. Typically, the prepolymer component has a viscosity of from about 200 to about 20,000, more typically from about 200 to about 10,000, yet more typically from about 200 to about 5,000, most typically from about 200 to about 2,500, and yet most typically from about 200 to about 500, centipoise (cP) at 25° C., according to ASTM D2196. In certain embodiments, the prepolymer component has a viscosity ranging from about 240 to about 270 cP at 25° C.

Without being bound or limited by any particular theory, it is believed that viscosity build of the prepolymer component is prevented since a majority of the prepolymer component preferentially reacts with the isocyanate monomers present in the second isocyanate component. In addition, if and when a portion of the prepolymer component reacts with NCO functional groups of higher oligomers present in the second isocyanate component, such oligomers are capped and/or cross-linked, since the polyol component can serve as a cross-linker between two or more NCO functional groups.

In certain embodiments, the prepolymer component further comprises a plasticizer component. If employed, the plasticizer component is useful for reducing the viscosity and NCO content of the prepolymer component. Suitable plasticizers, for purposes of the present invention, are described in detail further below. In certain embodiments, the plasticizer component is present in an amount of from about 20 to about 50, more typically from about 25 to about 45, and most typically from about 30 to about 40, parts by weight, based on 100 parts by weight of the prepolymer component. If employed, the plasticizer component is typically present during preparation of the prepolymer component (e.g. in the reaction vessel), and/or added to the prepolymer component after formation.

When the prepolymer system is employed to form the prepolymer composition, the diluent component and the prepolymer component can be present in the prepolymer composition in various weight ratios relative to each other. As described above, increasing the amount of the diluent component relative to the prepolymer component can have a dilution effect, which can lower the monomeric isocyanate content and the viscosity of the prepolymer composition formed from the prepolymer system. Generally, the diluent component and the prepolymer component are inert relative to one another, while combined and present in the prepolymer composition. This is predominately due to the presence of NCO functional groups, more typically due to the presence of only NCO functional groups, for both of the components. It is to be appreciated that the components may be kept separate from one another (i.e., as the prepolymer system) and then mixed or may be premixed to form the prepolymer composition, which is further described below. Other benefits of the components are also further described below.

Typically, the diluent and prepolymer components are present in the prepolymer composition (formed from the prepolymer system) in a weight ratio (respectively) of from about 20:80 to about 90:10, more typically from about 30:70 to about 90:10, yet more typically from about 40:60 to about 80:20, and most typically from about 40:60 to about 70:30. In one embodiment, the diluent and prepolymer components are present in the prepolymer composition formed from the prepolymer system in a weight ratio of about 50:50. In another embodiment, the diluent and prepolymer components are present in the prepolymer composition in a weight ratio of about 60:40

The aforementioned weight ratios of the diluent and prepolymer components impart the prepolymer composition with ratios of NCO to OH functional group equivalents (NCO equivalents to OH equivalents) based on the components having NCO and OH functional groups, and further, imparts the prepolymer composition with ratios of OH functional group equivalents of the monohydric isocyanate-reactive component to OH functional group equivalents of the prepolymer component (monohydric OH equivalents to polyhydric OH equivalents). Typically, the prepolymer composition has a ratio of NCO equivalents to OH equivalents of from about 2 to about 8, more typically from about 2.5 to about 7.5, yet more typically from about 3 to about 5, most typically from about 3 to about 4, and yet most typically about 3.5. Further, the prepolymer composition typically has a ratio of monohydric OH equivalents to polyhydric OH equivalents of from about 0.25 to about 33, more typically from about 1.5 to about 15, yet more typically from about 2.25 to about 10, most typically from about 3.5 to about 5.5, and yet most typically about 5.5.

Understandably, the prepolymer system (and therefore the prepolymer composition formed therefrom) has an excess of NCO functional groups. The prepolymer system has an NCO content established by the diluent and prepolymer components. Typically, the prepolymer system has an NCO content of from about 1% to about 30%, more typically from about 1% to about 20%, and most typically from about 5% to about 15%, by weight, based on 100 parts by weight of the prepolymer system. In certain embodiments, the prepolymer system has an NCO content ranging from about 11% to about 12% by weight.

The prepolymer system (and therefore the prepolymer composition formed therefrom) can have various monomeric isocyanate contents established by the diluent and prepolymer components. The prepolymer system has a monomeric isocyanate content of no greater than about 10%, more typically no greater than 7.5%, and most typically no greater then 5%, by weight, based on 100 parts by weight of the prepolymer system. In certain embodiments, the prepolymer system typically has a monomeric isocyanate content of from about 1% to about 10%, more typically from about 1% to about 7.5%, and most typically from about 3% to about 7.5%, by weight, based on 100 parts by weight of the prepolymer system.

The prepolymer composition formed from the prepolymer system can have various viscosities, depending in part on the specific diluent and prepolymer components, and amounts thereof, employed to form the prepolymer composition. As introduced above, the diluent component is especially useful for maintaining or lowering viscosity of the prepolymer composition, while providing additional NCO functional groups for subsequent reactions of the prepolymer composition. Further, the diluent component can provide a dilution effect with regard to the monomeric isocyanate content of the prepolymer composition. Typically, the prepolymer composition has a viscosity no greater than about 6,000, more typically no greater than about 4,000, yet more typically from about 500 to about 3,000, and most typically from about 500 to about 1,000, centipoise (cP) at 25° C., according to ASTM D2196, when the diluent and prepolymer components of the prepolymer system are combined. In certain embodiments, the prepolymer composition has a viscosity ranging from about 500 to about 600 cP at 25° C. Such viscosities are useful for reducing energy costs during use of the prepolymer composition, e.g. by reducing energy use during pumping. Less heat is also required to reduce viscosity (if so desired), relative to prepolymer compositions having higher initial viscosities.

Without being bound or limited by any particular theory, it is believed that viscosity build of the prepolymer composition is prevented, and viscosity of the prepolymer composition is relatively low, by balancing a relatively high amount of the monohydric isocyanate-reactive component employed to form the diluent component relative to the relatively high amount of higher ring oligomers imparted to the prepolymer composition by the first and second isocyanate components. In other words, since the high ring oligomers are not cross-linked by the monohydric isocyanate-reactive component, excellent viscosity profiles and stability is achieved for the prepolymer composition by employing the diluent and prepolymer components of the present invention. It is also believed that different types, and amounts thereof, of isomers and oligomers can be imparted to the prepolymer composition and therefore tailored by employing different types and amounts thereof of the diluent and prepolymer components of the present invention.

The prepolymer system may be supplied to consumers for use by various means, such as in railcars, tankers, large sized drums and containers or smaller sized drums, kits and packets. For example, one kit can contain the diluent component and another kit can contain the prepolymer component. Alternatively, the prepolymer composition can be supplied to consumers with the components of the prepolymer system pre-mixed, after each of the diluent and prepolymer components are initially formed separate from one another. However, providing the components of the prepolymer system to consumers separately provides for increased formulation flexibility of the prepolymer compositions formed therefrom. For example, a consumer can select a specific diluent component and a specific prepolymer component, and/or amounts thereof, to prepare the prepolymer composition. Further, a specific component, and an amount thereof, can be added to a premixed prepolymer composition, for example, to alter viscosity or monomeric isocyanate content of the premixed prepolymer composition. The diluent and prepolymer components have excellent storage stability. As such, the diluent and prepolymer components can be separately stored (as the prepolymer system) for extended periods of time before combining them to form the prepolymer composition. For example, the diluent component typically has a shelf life of at least about three months, more typically at least about four months and most typically at least about six months. Generally, the prepolymer composition also has excellent storage stability. It is to be appreciated that the prepolymer system can comprise two or more different diluent components and/or two or more different prepolymers components, which can be employed to prepare the prepolymer composition.

One method of preparing the prepolymer system comprises the step of I) reacting the monohydric isocyanate-reactive component with an excess of the first isocyanate component relative to the monohydric isocyanate-reactive component to form the diluent component. The aforementioned components of the diluent component can be combined and reacted in a reaction vessel, and optionally, in the presence of one or more additional components, e.g. the plasticizer component. The components can be agitated to facilitate reaction, such as with use of a mixing blade. Typically, an inert atmosphere (such as an atmosphere of dry air, argon (Ar), nitrogen ($N_2$), etc.) is established in the reaction vessel and over the components. The inert atmosphere is useful for preventing premature reactions during formation of the diluent component, such as premature reaction with ambient moisture. Typically, the first isocyanate component is added first to the reaction vessel, and optionally, with the additional component(s). The monohydric isocyanate-reactive component is then slowly added to the reaction vessel over a period of time, such as over a period of about 30 minutes, to promote a uniform and controlled reaction during formation of the diluent component. Temperature of the reaction vessel is generally maintained below a certain level, for safety reasons. Typically, temperature of the reaction vessel is maintained below about 80° C. The components are allowed to react for a period of time to form the diluent component, such as over a period of about 120 minutes. It is believed that all of the OH functional groups of the monohydric isocyanate-reactive component are thereby reacted due to excess NCO functional groups provided by the first isocyanate component. The diluent component is then allowed to cooled (or is cooled) and transferred to a storage vessel.

The method further comprises the step of II) reacting, separate from step I) (e.g. in a separate reaction vessel), the polyol component with an excess of the second isocyanate component relative to the polyol component to form the prepolymer component. The aforementioned components of the prepolymer component can be combined and reacted in a reaction vessel, and optionally, in the presence of one or more additional components, e.g. the plasticizer component. The components can be agitated to facilitate reaction, such as with use of a mixing blade. Typically, an inert atmosphere is established in the reaction vessel and over the components. Typically, the second isocyanate component is added first to the reaction vessel, and optionally, with the additional component(s). The polyol component is then slowly added to the reaction vessel over a period of time, such as over a period of about 30 minutes, to promote a uniform and controlled reaction during formation of the prepolymer component. Temperature of the reaction vessel is generally maintained below a certain level, for safety reasons. Typically, temperature of the reaction vessel is maintained below about 80° C. The components are allowed to react for a period of time to form the prepolymer component, such as over a period of about 120 minutes. It is believed that all of the OH functional groups of the polyol component are thereby reacted due to excess NCO functional groups provided by the second isocyanate component. The prepolymer component is then allowed to cooled (or is cooled) and transferred to a storage vessel.

It is to be appreciated that the reactions described above to form the components of the prepolymer system can occur in separate reaction vessels, as like described above, or in one reaction vessel, such as by employing a staged batch-reaction method, as understood to those skilled in the art.

One method of preparing the prepolymer composition comprises steps I) and II), as described and exemplified above with the method of preparing the prepolymer system. The method further comprises the step of III) mixing, separate from steps I) and II), the diluent component and the prepolymer component to form the prepolymer composition. The components can be mixed in various ratios, as described and exemplified above. The components can be mixed in a mixing vessel at room (or other) temperature, for various periods of time (e.g. for about 30 minutes). Various types of mixers can be used, as understood in the art. Typically, an inert atmosphere is established in the mixing vessel, such as an atmosphere of argon. The inert atmosphere is useful for preventing premature reactions during mixing, such as premature reaction of the prepolymer composition with ambient moisture. The method can further comprise the step of IV) providing the plasticizer component such that step III) is further defined as III) mixing, separate from steps I) and II), the diluent component, the prepolymer component, and the plasticizer component to form the prepolymer composition. However, if the plasticizer component is employed, the plasticizer component is typically employed during formation of the respective components of the prepolymer system, rather than being added to the prepolymer system later. Such an order of addition is useful for viscosity reasons, as alluded to and described above.

Another method of preparing the prepolymer composition comprises the steps of providing the diluent component and providing the prepolymer component. The diluent and prepolymer components may be provided by various means, as described and exemplified above. For example, the diluent and prepolymer components can be supplied in drums and fed to a storage vessel, to a mixing vessel, or to a spraying apparatus. Generally, the diluent and prepolymer components are provided by conventional methods used to form foams, such methods being well known to those skilled in the art. Examples of such methods are described in the U.S. Patents referenced above with description of the prepolymer component. As described above, it is to be appreciated that the components are initially formed separate from one another to form the prepolymer system, and then, the components of the prepolymer system are combined to form the prepolymer composition.

The method further comprises the step of mixing the diluent component and the prepolymer component of the prepolymer system to form the prepolymer composition. To prepare the prepolymer compositions, the components of the prepolymer system can be mixed by various methods, such as by mixing the components in a vessel, and/or by mixing the components during application or use of the prepolymer composition, such as by impingement mixing using a sprayer apparatus. Generally, the diluent and prepolymer components are mixed in (or by) conventional equipment used to form prepolymers or foams, such equipment being well known to those skilled in the art.

The present invention also provides a method of providing NCO functional groups for reaction while decreasing monomeric isocyanate content of a prepolymer composition. The method comprises the step of providing the diluent component (as described and exemplified above). The method further comprises the step of providing the prepolymer component (as described and exemplified above). The method further comprises the step of mixing the diluent and prepolymer components to form the prepolymer composition. This method is useful for providing additional NCO functional groups for reaction, such as reactions to form foam, while decreasing monomeric isocyanate content in the prepolymer composition. Further, the method is also useful for varying viscosity of the prepolymer composition, typically for maintaining viscosity, more typically for decreasing viscosity, of the prepolymer composition.

As introduced above, the prepolymer composition formed from the prepolymer system of the present invention can be used to manufacture foams. The prepolymer composition is especially useful for forming water-blown foams, i.e., foams formed via water serving as a chemical blowing agent, which is further described below. As described above, the prepolymer composition is especially useful due to its low monomeric isocyanate content, which provides for improved hygienic working conditions when the prepolymer composition is being employed for manufacturing articles, such as foams. For example, the amount of vaporous isocyanate monomers found in a surrounding airspace of the prepolymer composition is typically no greater than about 5, more typically no greater than about 3, yet more typically no greater than about 2, most typically no greater than about 1, and yet most typically approaching or equaling 0, parts per billion (ppb), based on parts by weight of the surrounding airspace. In certain embodiments, the amount of airborne vaporous isocyanate monomers (e.g. MMDI) ranges from about 1.2 to about 2.2 ppb, most typically about 2.0 ppb. Airborne vaporous isocyanate monomer levels can be determined by using a simulated OSHA 47 method employing LC-UV analysis.

The foamed article, formed from the prepolymer system, is commonly referred to in the art as polyurethane foam, polyisocyanurate foam, polyurea foam, or a hybrid of two or more of such foams. The foamed article comprises the reaction product of the diluent and prepolymer components (i.e., the prepolymer system) and a water component (which can also be referred as a "curative" component).

The water component comprises water, and is reactive with both the diluent component and the prepolymer component, specifically with the NCO functional groups of the diluent and prepolymer components, as understood in the art, and as illustrated below. In one embodiment, both the diluent and prepolymer components of the prepolymer system are pre-mixed to first form the prepolymer composition prior to introducing the prepolymer composition to the water component to form a reaction mixture. An example of an NCO group present within the prepolymer composition, i.e., an NCO functional group provided by one of the diluent or prepolymer components, reacting with a molecule of water provided by the water component to form an amine group and a molecule of carbon dioxide gas is illustrated below by simplified Reaction Scheme (III).

Reaction Scheme (III):

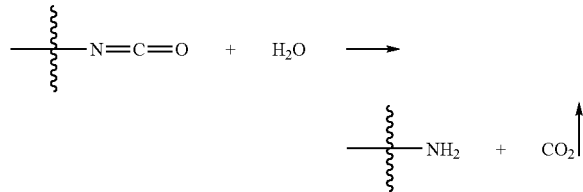

As understood by those skilled in the art, the carbon dioxide ($CO_2$) gas formed (via the reaction of NCO functional groups and water) serves as a physical blowing agent during formation of the foamed article, whereas the water component initially serves as a chemical blowing agent to generate the carbon dioxide gas. The amine group, after forming, then reacts with another NCO functional group, if still present, i.e., available, within the prepolymer composition to form a urea linkage. An example of such a reaction is illustrated below by simplified Reaction Scheme (IV).

Reaction Scheme (IV):

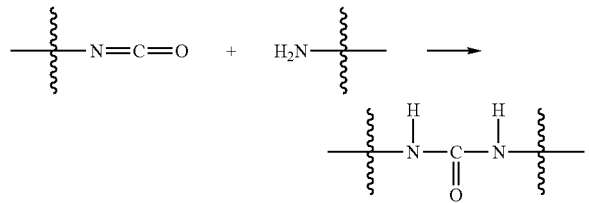

Various types of water may be used, for purposes of the present invention. In certain embodiments, the water component is distilled water. In other embodiments, the water component is distilled and deionized water, having essentially no impurities.

The water component may be used in various amounts to make the foamed article. Generally, the amount of the water component used is based upon desired end properties of the foamed article, such as density, which is further described below. The prepolymer composition is typically used in a stoichiometric excess, based upon the amount of NCO functional groups (of the prepolymer composition) relative to molecules of water, to provide sufficient NCO functional groups for both reactions as illustrated in Reaction Schemes (III) and (IV) above; however, the water component may be used in any desired amount. Typically, the water component is employed in at a volume ratio of from about 1.0:30 to about 1:15, more typically from about 1.0:27 to about 1.0:17, and most typically from about 1.0:25 to about 1.0:18, relative to the prepolymer composition The foamed article may be formed in the presence of additional components, in addition to the diluent and prepolymer component (e.g. the prepolymer composition) and the water component. If employed, it is to be appreciated that the additional component (or components) may be reactive with other components present during formation of the foamed article. The additional component(s) may be essentially inert with other components present during formation of the foamed article.

As introduced above, in certain embodiments, at least one of the diluent and prepolymer components comprises the plasticizer component. In other words, the prepolymer system, and therefore the prepolymer composition, can further comprise the plasticizer component, with the plasticizer component present in the diluent component and/or the prepolymer component. Alternatively, the plasticizer component may be added separately to the prepolymer composition as an additional component, or added to the reaction mixture as an additional component during preparation of the foamed article. The plasticizer component is useful for varying the viscosity of the prepolymer composition, typically for lowering the viscosity of the prepolymer composition. In addition, the plasticizer component can be useful for controlling a softness of the foamed article. Further, the plasticizer component can have a diluent effect, which can lower the NCO content and the monomeric isocyanate content of the prepolymer composition. In certain embodiments, the plasticizer component is non-functional. In other words, if employed, the plasticizer component is inert with respect to the components employed to form the prepolymer composition (i.e., the diluent and prepolymer components) and typically, those components employed to form the foamed article.

Suitable plasticizers, for purposes of the present invention, include conventional plasticizers known in the art, such as esters of dibasic or polybasic carboxylic acids with monohydric alcohols. Examples of such polycarboxylic acids include, succinic acid, isophthalic acid, trimellitic acid, phthalic acid anhydride, tetrahydrophthalic acid anhydride, hexahydrophthalic acid anhydride, endomethylene-tetrahydrophthalic acid anhydride, glutaric acid anhydride, maleic acid anhydride, fumaric acid and dimeric and trimeric fatty acids (such as oleic acid), and combinations thereof, which may be mixed with monomeric fatty acids. Suitable monohydric alcohols are as described and exemplified above with description of the monohydric isocyanate-reactive component.

Other examples of suitable plasticizers include, but are not limited to; phthalates, such as dioctyl phthalate, diisooctyl phthalate, diisononyl phthalate, dimethyl phthalate, dibutyl phthalate; phosphates, such as tributyl phosphate, triethyl phosphate (TEP), triphenyl phosphate and cresyl diphenyl phosphate; chlorinated biphenyls; aromatic oils; adipates, such as diisononyl adipate and di-(2-ethylhexyl) adipate; and combinations thereof. If employed as a plasticizer component, TEP is especially useful for masking odors (e.g. amine odors), which may be present in one or more of the components of the present invention, such as the catalyst component of the foamed article, if employed. TEP can also be useful for imparting flame retardancy, if employed. Specific examples of suitable plasticizers are commercially available from the BASF Corporation under the trademark of PALATINOL®, such as PALATINOL® 711P, and under the trademark of PLASTOMOLL®, such as PLASTOMOLL® DNA and PLASTOMOLL® DOA. Typically, the prepolymer composition of the present invention does not have an objectionable or noxious odor, which is useful for manufacturing purposes.

Other examples of suitable plasticizers, for purposes of the present invention, include phosphoric acid esters of the above-mentioned branched and unbranched aliphatic, cycloaliphatic and aromatic alcohols. If appropriate, phosphates of halogenated alcohols, for example, trichloroethyl phosphate, can also be employed. Such phosphates of halogenated alcohols are particularly advantageous in that they also impart a flame-retarding finish to the foamed article. It is to be appreciated that mixed esters of the aforementioned alcohols and carboxylic acids can also be employed. So called polymeric plasticizers can also be employed, for purposes of the present invention. Examples of such plasticizers include polyesters of adipic acid, sebacic acid or phthalic acid. Phenol alkylsulfonates, e.g. phenyl paraffinsulfonates, can also be employed. It is to be appreciated that the plasticizer component may include any combination of two or more of the aforementioned plasticizers.

If employed, the plasticizer component may be used in various amounts. In certain embodiments, where the prepolymer composition (or system) includes the plasticizer component, the plasticizer component is present in an amount of from about 1 to about 60, more typically from about 10 to about 50, yet more typically from about 30 to about 50, and most typically from about 30 to about 40, parts by weight, based on 100 parts by weight of the prepolymer composition (or system). In other embodiments, the foamed article includes analogous amounts by weight of the plasticizer component based on 100 parts by weight of the foamed article.

In certain embodiments, at least one of the diluent, prepolymer, and water components comprises a surfactant component. In other words, the prepolymer system and prepolymer composition can further comprise the surfactant component, with the surfactant component present in the diluent component and/or the prepolymer component. Alternatively, the surfactant component may be added separately to the prepolymer composition as an additional component, added to the water component, or added to the reaction mixture as an additional component during preparation of the foamed article. The surfactant component is useful in cell formation and cell stabilization when the prepolymer composition is used to form the foamed article.

Suitable surfactants, for purposes of the present invention include conventional surfactants known in the art, such as anionic, cationic, non-ionic surfactants, and mixtures thereof. Suitable nonionic surfactants include those prepared by the sequential addition of propylene oxide and then ethylene oxide to propylene glycol, solid or liquid organosilicones, polyethylene glycol ethers of long chain alcohols, tertiary amine or alkylolamine salt of long chain alkyl acid sulfate esters, alkyl sulfonic ester and alkyl arylsulfonic acids. Liquid organosilicones, specifically those that are not hydrolyzable, are also useful. Suitable surfactants, for purposes of the present invention, are commercially available from Air Products and Chemicals, Inc. of Allentown, Pa. and GE Silicones of Albany, N.Y.. A specific example of a suitable surfactant is NIAX L-5340, commercially available from GE Silicones. It is to be appreciated that the surfactant component may include any combination of two or more of the aforementioned surfactants.

If employed, the surfactant component may be used in various amounts. In certain embodiments, where the prepolymer composition (or system) includes the surfactant component, the plasticizer component is present in an amount of from about 0.5 to about 10, more typically from about 0.5 to about 5, and most typically from about 0.5 to about 3, parts by weight, based on 100 parts by weight of the prepolymer composition (or system). In other embodiments, the foamed article includes analogous amounts by weight of the surfactant component based on 100 parts by weight of the foamed article In certain embodiments, at least one of the diluent, prepolymer, and water components comprises a catalyst component. In other words, the prepolymer system and prepolymer composition can further comprise the catalyst component, with the catalyst component present in the diluent component and/or the prepolymer component. Alternatively, the surfactant component may be added separately to the prepolymer composition as an additional component, to the water component, or added to the reaction mixture as an additional component during preparation of the foamed article. The catalyst component is useful for catalyzing the reactions that form the foamed article, such as the reaction illustrated in Reaction Scheme (IV) above.

If employed, in certain embodiments, the catalyst component is an organometallic catalyst. In these embodiments, the catalyst component typically includes at least one of, but is not limited to, tin, iron, lead, bismuth, mercury, titanium, hafnium, zirconium, and combinations thereof. In certain embodiments, the catalyst component comprises a tin catalyst. Suitable tin catalysts, for purposes of the present invention, include tin(II) salts of organic carboxylic acids, e.g. tin(II) acetate, tin(II) octoate, tin(II) ethylhexanoate and tin (II) laurate. In one embodiment, the organometallic catalyst comprises dibutyltin dilaurate, which is a dialkyltin(IV) salt of an organic carboxylic acid. Specific examples of suitable organometallic catalyst, e.g. dibutyltin dilaurates, for purposes of the present invention, are commercially available from Air Products and Chemicals, Inc. under the trademark of DABCO®. The organometallic catalyst can also comprise other dialkyltin(IV) salts of organic carboxylic acids, such as dibutyltin diacetate, dibutyltin maleate and dioctyltin diacetate.

Examples of other suitable catalysts, for purposes of the present invention, include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, for purposes of the present invention, include N,N,N-dimethylaminopropylhexahydrotriazine, potassium, potassium acetate, N,N,N-trimethyl isopropyl amine/formate, and combinations thereof. Specific examples of suitable trimerization catalysts are commercially available from Air Products and Chemicals, Inc. under the trademark of POLYCAT® or DABCO®.

Yet further examples of other suitable catalysts, specifically tertiary amine catalysts, for purposes of the present invention, include dimethylaminoethanol, dimethylaminoethoxyethanol, triethylamine, N,N,N',N'-tetramethylethylenediamine, N,N-dimethylaminopropylamine, N,N,N',N',N''-pentamethyldipropylenetriamine, tris(dimethylaminopropyl)amine, N,N-dimethylpiperazine, tetramethylimino-bis(propylamine), dimethylbenzylamine, trimethyl amine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N''-pentamethyldiethylenetriamine, 1,2-dimethylimidazole, 3-(dimethylamino)propylimidazole, and combinations thereof. Specific examples of suitable tertiary amine catalysts are commercially available from Air Products and Chemicals, Inc. under the trademark of POLYCAT® or DABCO®, such as DABCO® BL-19 catalyst. It is to be appreciated that the catalyst component may include any combination of two or more of the aforementioned catalysts.

If employed, the catalyst component may be used in various amounts. In certain embodiments, where the water component includes the catalyst component, the catalyst component is present in an amount of from about 15 to about 50, more typically from about 20 to about 40, yet more typically from about 25 to about 30, and most typically about 25, parts by weight, based on 100 parts by weight of the water component.

In certain embodiments, the foamed article comprises the reaction product of an auxiliary polyol. In other words, the foamed article can, for example, be formed from the reaction of the prepolymer composition, water component, and the auxiliary polyol. Those skilled in the art appreciate that the auxiliary polyol can react with the NCO groups of the prepolymer composition to form urethane linkages, similar to Reaction Schemes (I) and (II) illustrated above. If employed, the auxiliary polyol may be any conventional polyol known in the art, and can be useful for imparting specific properties to the foamed article, such as cross-link density. The auxiliary polyol may be the same as or different than the polyol of the prepolymer component. As such, suitable polyols, for use as the auxiliary polyol, are as the described and exemplified above with description of the polyol component of the prepolymer composition.

If employed, the auxiliary polyol may be used in various amounts. In certain embodiments, the auxiliary polyol is present in an amount of from about 1 to about 20, more typically from about 1 to about 15, and most typically from about 1 to about 10, parts by weight, based on 100 parts by weight of the foamed article.

In certain embodiments, at least one of the diluent and prepolymer components comprises an auxiliary blowing agent. In other words, the prepolymer system and composition can further comprise the auxiliary blowing agent, with the auxiliary blowing agent present in the diluent component and/or the prepolymer component. Alternatively, the auxiliary blowing agent may be added separately to the prepolymer composition as an additional component, or more typically, added to the reaction mixture as an additional component during preparation of the foamed article. The auxiliary blowing agent is useful for further foaming the reaction mixture during formation of the foamed article in addition to foaming established by the water component.

If employed, the auxiliary blowing agent is typically a physical blowing agent, since the water component is already being used as a chemical blowing agent, as described and illustrated above. As used herein, physical blowing agents are blowing agents that retain their original chemical structure throughout a blowing process, i.e., the physical blowing agent does not react with any of the components employed to make the foamed article. If employed as the auxiliary blowing agent, the physical blowing agent is typically a hydrofluorocarbon (HFC) due to nonflammability and zero ozone depletion potential. Examples of suitable physical blowing agents, for purposes of the present invention include, but are not limited to, HFC-134a, HFC-152a, HFC-245fa, HFC-365mfc, HFC-22, and combinations thereof. If employed, the auxiliary blowing agent may be included in any amount as desired by those of skill in the art. It is to be appreciated that the auxiliary blowing agent is not required for purposes of the present invention. In other words, for purposes of the present invention, the water component can be employed as a sole blowing agent.

In certain embodiments, at least one of the diluent and prepolymer components comprises an additive component. In other words, the prepolymer system and composition can further comprise the additive component, with the additive component present in the diluent component and/or the prepolymer component. Alternatively, the additive component may be added separately to the prepolymer composition as an additional component, or added to the reaction mixture as an additional component during preparation of the foamed article.

The additive component may comprise any conventional additive known in the art, such as those employed in conventional prepolymers and foams, such as water-blown foams. Suitable additives, for purposes of the present invention include, but are not limited to, chain-extenders, cross-linkers, chain-terminators, processing additives, adhesion promoters, flame retardants, anti-oxidants, water scavengers, fumed silicas, dyes, ultraviolet light stabilizers, fillers, thixotropic agents, silicones, blowing agents, inert diluents, and combinations thereof. If employed, the additive component may be included in any amount as desired by those of skill in the art.

The foamed article can have various densities based on the specific components, and amounts thereof, employed. Typically, the foamed article has a density of from about 1 to about 10, more typically from about 1.5 to about 5, yet more typically from about 1.5 to about 3, and most typically about 1.6, pounds per cubic foot (lbs/ft$^3$). Density of the foamed article can be determined according to ASTM D3574. The foamed article generally has low water absorption, such as 30% by weight or lower.

The foamed article can have various rise times based upon the specific components, and amounts thereof, employed. Those of ordinary skill in the art appreciate that "rise time" is generally the time required for foaming of a reaction mixture to end. Typically, the foamed article (during formation) has a rise time of from about 1 to about 30, more typically from about 1 to about 20, yet more typically from about 1 to about 10, and most typically about 5, seconds. Rise time of the foamed article can be determined by visual inspection during formation.

The foamed article can have various cream times based on the specific components, and amount thereof, employed. Those of ordinary skill in the art appreciate that "cream time" is generally the time at which material volume begins to increase (i.e., a reaction mixture from initially a liquid state to a foaming state). Typically, the foamed article has a cream time of less than about 1 second. Cream time of the foamed article can be determined by visual inspection during formation.

The foamed article can have various tack-free times based on the specific components, and amounts thereof, employed. Those of ordinary skill in the art appreciate that "tack-free time" is the time at which a surface of the foamed article is tack-free. Typically, the foamed article has a tack-free time of at least about 12, more typically at least about 9, and most typically at least about 6, seconds. Tack-free time of the foamed article can be determined by placing a gloved finger on the surface of the foamed article and pulling away quickly to determine tack of the surface.

In certain embodiments, the foamed article comprises the reaction product of the prepolymer composition and the water component, and the water component comprises the catalyst and surfactant components (in addition to water). In these embodiments, the prepolymer composition and the water component are employed in a volume ratio (respectively) of from about 15:1 to about 30:1, more typically from about 17:1 to about 27:1, and most typically from about 18:1 to about 25:1, to form the foamed article. In one embodiment, the prepolymer composition and the water component including the catalyst and surfactant (collectively the "curative" component) are employed in a volume ratio of about 24:1 to form the foamed article. It is to be appreciated that the foamed article can be formed from just the prepolymer composition and water component or, optionally, with the catalyst and/or surfactant components.

Due in part to the density and rise time of the foamed article, the foamed article is especially useful for use in filling cavities (e.g. pillars, beams, sills, etc.) of automobile bodies (or shells), such as car and truck bodies; however, the foamed article may be used for various applications known in the art. The foamed article is generally low in density, and affords good adhesion to surfaces, such as primed (e-coated) car bodies. Typically, the foamed article, during formation, completely fills the cavity due to its rise time, affording good sound insulation properties to an automobile (depending on amounts employed). In other words, the foamed article is useful for acoustical dampening applications, such as by reducing road noise experienced by passengers of the automobile.

One method of preparing the foamed article comprises the steps of providing the diluent component, providing the prepolymer component, and providing the water component. The diluent and prepolymer components, and water component, may be provided by various means, as described and exemplified above. For example, the diluent and prepolymer components (i.e., the prepolymer system) can be supplied in drums and fed to a vessel or to a spraying apparatus along with the water component. Generally, the diluent and prepolymer components and water component are provided by conventional methods used to form foams, e.g. water-blown foams, such methods being well known to those skilled in the art.

The method of preparing the foamed article further comprises the step of reacting the diluent and prepolymer components, with the water component, to form the foamed article. As described and exemplified above, the diluent and prepolymer components are generally inert with respect to one another, but both are reactive with the water component, to impart cross-linking and foaming of the foamed article, during formation. The components of the foamed article can be reacted by various methods, such as by mixing the components in a vessel, and/or by mixing the components during application or use of the prepolymer system, such as by impingement mixing the prepolymer system and the water component using a sprayer apparatus. It is to be appreciated that the components of the prepolymer system may be kept separate until they are reacted with the water component, or may be premixed to form the prepolymer composition and then reacted with water component, as described and exemplified above. Premixing helps to ensure proper ratios of the diluent and prepolymer components. Typically, the diluent and prepolymer components of the prepolymer system are mixed together to form the prepolymer composition, and then the water component is added to the prepolymer composition to initiate reaction to form the foamed article.

Generally, the diluent and prepolymer components of the prepolymer system and the water component are mixed in (or by) conventional equipment used to form foams, e.g. water-blown foams, such equipment being well known to those skilled in the art. In one embodiment, the prepolymer composition is pumped to a mixing head where it is mixed with the water component in a very short time, such as at most about 5 seconds, more typically at most about 2 seconds, and most typically at most about 1 second, and subsequently dispensed, for example, into a cavity, e.g. an automobile cavity, or into a mold. Other systems known in the art that are used to form foams, such as conveying systems, can also be employed. Typically, when forming the foamed article from the prepolymer composition and the water component, it is preferred that the prepolymer composition and the water component are two separate streams that are contacted and uniformly mixed and dispensed from a mixing head. In another embodiment, each of the diluent and prepolymer components and the water component are three (or more) separate streams that are contacted and uniformly mixed and dispensed from a mixing head. In the aforementioned embodiments, other components, if employed, e.g. the catalyst and surfactant components, can be included with one of the streams, a combination of the streams, or in one or more separate and distinct streams. Suitable mixing heads, for purposes of the present invention, include those commercially available for making foams, e.g. polyurethane foams, and are well known to those skilled in the art.

The method of preparing the foamed article can further comprise the step of providing at least one of the catalyst component and the surfactant component (i.e., the step of providing the catalyst and/or surfactant component), if employed to form the foamed article. As described above, the catalyst and surfactant components can be present during various stages of formation of the foamed article, such as already being present in one or both of the diluent and prepolymer components, the water component, and/or added separately during reaction to form the foamed article. The other component (or components) described and exemplified above, such as the plasticizer component, can also be employed in the same or similar way. It is to be appreciated that the aforementioned method of forming the prepolymer composition can also include the step of providing one or more of the aforementioned additional components, such as the surfactant, catalyst, and/or plasticizer component(s). For example, such component(s), if employed, can be mixed with the diluent and prepolymer components to form the prepolymer composition.

Generally, the time to form the foamed article is as short as practicable and may be from about 1 second to about 20 seconds, more typically from about 1 second to about 10 seconds, and yet more typically from about 1 second to about 5 seconds. Most typically, the time to form the foamed article is from about 1 second to about 5 seconds, and yet most typically from about 1 second to about 3 seconds. The temperature of the components employed to form the foamed article, is generally great enough for the foamed article to be formed but not so great that the foamed article or components employed to form the foamed article decompose. Typically, the temperature ranges from room temperature (~22±2° C.) up to about 100, more typically from about 22 to about 90, and most typically from about 38 to about 82° C. Such temperatures can be used for preheating the prepolymer composition and, optionally, the water component prior to combining. For example, the prepolymer composition can be kept at about 82° C. and the water component can be kept at about 38° C. Pressures of application of the foamed article are as typically employed, such as when employing a mixing head, e.g. a Gusmer head, commercially available from Graco Ohio Inc. of North Canton, Ohio. Suitable foaming equipment, for purposes of the present invention, is commercially available from The Cannon Group of Cranberry Twp. Pa.

The following examples, illustrating the diluent and prepolymer components of the prepolymer system, and the prepolymer composition and the foamed article formed from the prepolymer system of the present invention, are intended to illustrate and not to limit the invention.

EXAMPLES

Examples of the diluent and prepolymer components are prepared. The amount and type of each component used to form the diluent and prepolymer components of the prepolymer system is indicated in Table I below with all values in parts by weight based on 100 parts by weight of all of the components prior to reaction to make the respective component unless otherwise indicated. The symbol '—' indicates that the component is absent from the formulation.

Polyol 1 is a polypropylene glycol having a hydroxyl (OH) number of from 102 to 112 mg KOH/gm and a nominal molecular weight of 1,000, commercially available from the BASF Corporation.

Polyol 2 is a polypropylene glycol having a hydroxyl (OH) number of from 140 to 150 mg KOH/gm and a nominal molecular weight of 700, commercially available from the BASF Corporation.

Plasticizer is diisononyl adipate (DNA), commercially available from the BASF Corporation.

To form the diluent components, the isocyanate component and plasticizer component are charged to a flask including a mixer and a water jacket. An inert, e.g. argon (Ar), atmosphere is established over the components in the flask. The mixer is started to agitate the components, and the flask is heated to 60° C. The monohydric isocyanate-reactive component is slowly added to the flask over a period of 30 minutes while maintaining temperature of the flask below 80° C. The monohydric isocyanate-reactive and isocyanate components are allowed to react at 80° C. for a period of 120 minutes to form the diluent component. The flask is cooled (or allowed to cool) to room temperature and the diluent component is removed from the flask and stored. To form the prepolymer components, the same procedure is employed as for forming the diluent components, but for substituting the polyol components for the monohydric isocyanate-reactive components.

NCO group content is determined using a titration method similar to that of ASTM D5155-01. Quantitative HPLC analysis is used for determination of monomeric isocyanate (e.g. monomeric MDI/MMDI) content in the prepolymer and diluent components, using appropriate urethane derivatives of 4,4'-MDI and 2,4'-MDI as standards. Viscosity is determined according to ASTM D2196.

Examples of the prepolymer compositions are prepared. To form the prepolymer compositions, the components of each of the compositions are combined in a mixing vessel and mixed to form the prepolymer compositions. An argon (Ar) atmosphere is established over the components in the vessel to prevent premature reaction with ambient moisture. The

TABLE I

| Component | Diluent Component 1 | Diluent Component 2 | Prepolymer Component 1 | Prepolymer Component 2 |
|---|---|---|---|---|
| First Isocyanate (wt %) | 48.0 | 52.46 | — | — |
| Second Isocyanate (wt %) | — | — | 32.0 | 34.19 |
| Monohydric Isocyanate-Reactive 1 (wt %) | 16.0 | — | — | — |
| Monohydric Isocyanate-Reactive 2 (wt %) | — | 11.54 | — | — |
| Polyol 1 (wt %) | — | — | 32.0 | — |
| Polyol 2 (wt %) | — | — | — | 29.81 |
| Plasticizer 1 (wt %) | 36.0 | 36.0 | 36.0 | 36.0 |
| Total | 100 | 100 | 100 | 100 |
| Viscosity (cP @ 25° C.) | 670 | 900 | 3260 | 6480 |
| NCO groups (wt %) | 9.4 | 9.4 | 7.1 | 7.0 |
| Monomeric isocyanate content (wt %) | 5.1 | 4.3 | 4.4 | 3.8 |

First Isocyanate is a polymethylene polyphenylpolyisocyanate (PMDI) having an NCO content of 31 wt % and comprising a monomeric MDI content of from 28 wt % to 33 wt %, commercially available from the BASF Corporation of Florham Park, N.J.

Second Isocyanate is the same as the First Isocyanate Component.

Monohydric Isocyanate-Reactive 1 is 2-ethylhexanol.
Monohydric Isocyanate-Reactive 2 is n-butanol.

components are mixed for 30 minutes at room temperature to form the prepolymer composition. The prepolymer composition is transferred to a storage vessel. The amount and type of each component used to form the prepolymer composition from the prepolymer system is indicated in Table II below with all values in parts by weight based on 100 parts by weight of all of the components to make the prepolymer composition unless otherwise indicated. The symbol '—' indicates that the component is absent from the formulation. The

TABLE II

| Component | Prepolymer Composition 1 | Prepolymer Composition 2 |
|---|---|---|
| Diluent 1 (wt %) | 50 | — |
| Diluent 2 (wt %) | — | 50 |
| Prepolymer 1 (wt %) | 50 | — |
| Prepolymer 2 (wt %) | — | 50 |
| Total | 100 | 100 |
| Viscosity (cP @ 25° C.) | 1830 | 3080 |
| NCO groups (wt %) | 8.3 | 8.2 |
| Monomeric isocyanate content (wt %) | 4.7 | 4.0 |

An example of the foamed article is prepared from Prepolymer Composition 1 using standard hand-mix techniques. Specifically, the components of each of the compositions are combined in a vessel and mixed to form the prepolymer compositions. The prepolymer composition is added to the water component to form a reaction mixture using a spray-head. The reaction mixture is sprayed via the spray-head into a cavity simulating an automobile cavity and allowed to cure to form the foamed article. The amount and type of each component used to form the foamed article from Prepolymer Composition 1 is indicated in Table III below with all values in parts by volume based on 100 parts by volume of all of the components to make the Foamed Article unless otherwise indicated.

TABLE III

| Component | Foamed Article |
|---|---|
| Prepolymer Composition | 23.76 |
| Surfactant | 0.24 |
| Water | 0.75 |
| Catalyst | 0.25 |

Surfactant is a silicone based surfactant commercially available from GE Silicones of Albany, N.Y.

Catalyst is an amine catalyst, specifically bis (dimethylaminoethyl)ether, commercially available from Air Products and Chemicals, Inc. of Allentown, Pa.

The foamed article is a polyurethane (PUR) foam of low density, specifically a density of less than 10 lbs/ft$^3$, more specifically, less than 2 lbs/ft$^3$. The foamed article has excellent sound-dampening properties for use in acoustic applications, such as for filling cavities of automobile bodies to dampen road noise. The foamed article affords good adhesion to a primed (e-coated) car body. As such, the foamed article generally does not vibrate, and completely fills the cavity (via high expansion and rising while forming) to adequately dampen sound.

Additional examples of the diluent and prepolymer components are prepared, as well as an additional prepolymer composition formed therefrom. A comparative prepolymer composition is also prepared. The amount and type of each component used to form the diluent and prepolymer components of the prepolymer composition and the comparative prepolymer composition is indicated in Table IV below with all values in parts by weight based on 100 parts by weight of all of the components prior to reaction unless otherwise indicated. The symbol '–' indicates that the component is absent from the formulation.

TABLE IV

| Component | Diluent Component 2 | Prepolymer Component 3 | Comparative Prepolymer Composition |
|---|---|---|---|
| First Isocyanate (wt %) | 52.46 | — | 53.40 |
| Second Isocyanate (wt %) | — | 54.81 | — |
| Monohydric Isocyanate-Reactive 1 (wt %) | 11.54 | — | 6.92 |
| Monohydric Isocyanate-Reactive 2 (wt %) | — | — | — |
| Polyol 1 (wt %) | — | — | — |
| Polyol 2 (wt %) | — | — | — |
| Polyol 3 (wt %) | — | 9.19 | 3.68 |
| Plasticizer 1 (wt %) | 36.0 | 18.0 | 28.80 |
| Plasticizer 2 (wt %) | — | 18.0 | 7.20 |
| Total | 100 | 100 | 100 |

Polyol 3 is a polypropylene glycol having a hydroxyl (OH) number of from 250 to 270 mg KOH/gm and a nominal molecular weight of 400, commercially available from the BASF Corporation.

Plasticizer 2 is triethyl phosphate (TEP).

The diluent and prepolymer components are each separately made as like described above. After formation, the diluent and prepolymer components are mixed in a ratio of 60 parts by weight of the diluent component to 40 parts by weight of the prepolymer component to form Prepolymer Composition 3. A final chemical makeup of the Prepolymer Composition 3 is determined by normalization of the respective formulas and in light of the ratio employed. The final chemical makeup, of all of the components employed to form Prepolymer Composition 3, is illustrated in Table IV and used to prepare the Comparative Prepolymer Composition. Specifically, the Comparative Prepolymer Composition is an "all at once" approach, where all of the components are employed and therefore simultaneously reacted at once, as described further below. This is in stark contrast to the present invention, where each of the diluent and prepolymer components are made separate from each other, and then combined to form the prepolymer composition of the present invention.

To form the Comparative Prepolymer Composition, the plasticizers and isocyanate component are charged to a flask including a mixer and a water jacket. An argon (Ar) atmosphere is established over the components in the flask. The mixer is started to agitate the components, and the flask is heated to 60° C. The polyol and monohydric isocyanate-reactive component are slowly added to the flask over a period of 30 minutes while maintaining temperature of the flask below 80° C. The polyol and monohydric isocyanate-reactive components are allowed to simultaneously react with the isocyanate component for a period of 120 minutes at 80° C. to form the Comparative Prepolymer Composition. The flask is cooled (or allowed to cool) to room temperature and the Comparative Prepolymer Composition is removed from the flask and stored. The symbol '---' indicates that the property was not measured.

TABLE V

| | Prepolymer Composition 3 | Comparative Prepolymer Composition |
|---|---|---|
| Viscosity (cP @ 25° C.) | 557 | 643 |
| NCO groups (wt %) | 11.5 | 11.3 |
| Monomeric isocyanate content (wt %) | — | 7.01 |

It is believed that viscosity of the Comparative Prepolymer Composition is higher than that of the Prepolymer Composition 3 due to formation of polymeric species not present in Prepolymer Composition 3, specifically, polymeric species consisting of diisocyanates that have been capped with one monohydric isocyanate-reactive component on one of its respective NCO functional groups and one polyol component on its other respective NCO functional group. Such polymeric species are not present in Prepolymer Composition 3, since all three of the aforementioned components are never brought together at once to simultaneously react.

The present invention has been described herein in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims.

What is claimed is:

1. A prepolymer system having a monomeric isocyanate content of no greater than about 10% by weight based on 100 parts by weight of said prepolymer system, said prepolymer system comprising:
   I) a diluent component having an excess of isocyanate functional groups and comprising the reaction product of
      a monohydric isocyanate-reactive component, and
      an excess of a first isocyanate component relative to said monohydric isocyanate-reactive component, said first isocyanate component comprising polymeric diphenylmethane diisocyanate and monomeric isocyanates reactive with said monohydric isocyanate-reactive component and having at least two isocyanate functional groups reactive with said monohydric isocyanate-reactive component; and
   II) a prepolymer component different than and separate from said diluent component, said prepolymer component also having an excess of isocyanate functional groups and comprising the reaction product of
      a polyol component having at least two hydroxyl functional groups, and
      an excess of a second isocyanate component relative to said polyol component, said second isocyanate component having at least two isocyanate functional groups reactive with said polyol component.

2. A prepolymer system as set forth in claim 1 further comprising a plasticizer component.

3. A prepolymer system as set forth in claim 2 wherein said plasticizer component is non-functional such that said plasticizer component does not react with either of said diluent and prepolymer components.

4. A prepolymer system as set forth in claim 1 having a viscosity no greater than about 6,000 cP at 25° C. according to ASTM D2196 when said diluent and prepolymer components are combined.

5. A prepolymer system as set forth in claim 1 having a monomeric isocyanate content of no greater than about 7.5% by weight based on 100 parts by weight of said prepolymer system.

6. A prepolymer system as set forth in claim 5 having a viscosity no greater than about 4,000 cP at 25° C. according to ASTM D2196 when said diluent and prepolymer components are combined.

7. A prepolymer system as set forth in claim 1 having an isocyanate functional group content of from about 1% to about 30% by weight based on 100 parts by weight of said prepolymer system.

8. A prepolymer system as set forth in claim 1 wherein said diluent component has a monomeric isocyanate content no greater than about 10% by weight based on 100 parts by weight of said diluent component.

9. A prepolymer system as set forth in claim 8 wherein said diluent component has an isocyanate functional group content of from about 1% to about 25% by weight based on 100 parts by weight of said diluent component.

10. A prepolymer system as set forth in claim 9 wherein said diluent component has a viscosity no greater than about 3,000 cP at 25° C. according to ASTM D2196.

11. A prepolymer system as set forth in claim 1 wherein said monohydric isocyanate-reactive component comprises an alcohol having from 1 to 20 carbon atoms.

12. A prepolymer system as set forth in claim 11 wherein said first isocyanate component further comprises toluene diisocyanates, hexamethylene diisocyanates, isophorone diisocyanates, naphthalene diisocyanates, or combinations thereof and said second isocyanate component is selected from the group of diphenylmethane diisocyanates, polymeric diphenylmethane diisocyanates, toluene diisocyanates, hexamethylene diisocyanates, isophorone diisocyanates, naphthalene diisocyanates, or a combination thereof.

13. A prepolymer system as set forth in claim 1 wherein said second isocyanate component comprises monomeric isocyanates reactive with said polyol component.

14. A prepolymer system having a monomeric isocyanate content of no greater than about 10% by weight based on 100 parts by weight of said prepolymer system, said prepolymer system comprising:
   I) a diluent component having an excess of isocyanate functional groups and a monomeric isocyanate content of no greater than about 10% by weight based on 100 parts by weight of said diluent component, said diluent component comprising the reaction product of
      a monohydric isocyanate-reactive component comprising an alcohol having from 1 to 20 carbon atoms, and
      an excess of a first isocyanate component relative to said monohydric isocyanate-reactive component, said first isocyanate component comprising polymeric diphenylmethane diisocyanate and monomeric isocyanates reactive with said monohydric isocyanate-reactive component and said first isocyanate component having at least two isocyanate functional groups reactive with said monohydric isocyanate-reactive component;
   II) a prepolymer component different than and separate from said diluent component, said prepolymer component having an excess of isocyanate functional groups and comprising the reaction product of
      a polyol component having at least two hydroxyl functional groups, and
      an excess of a second isocyanate component relative to said polyol component, said second isocyanate component comprising monomeric isocyanates reactive with said polyol component and having at least two isocyanate functional groups reactive with said polyol component; and
   a plasticizer component which is non-functional such that said plasticizer component does not react with either of said diluent and prepolymer components; and
   wherein said prepolymer system has an isocyanate functional group content of from about 1% to about 30% by weight based on 100 parts by weight of said prepolymer system and has a viscosity no greater than about 6,000 cP at 25° C. according to ASTM D2196 when said diluent and prepolymer components are combined.

15. A prepolymer system as set forth in claim 14 having a monomeric isocyanate content of no greater than about 7.5% by weight based on 100 parts by weight of said prepolymer system.

16. A prepolymer system as set forth in claim 15 having a viscosity no greater than about 4,000 cP at 25° C. according to ASTM D2196 when said diluent and prepolymer components are combined.

17. A prepolymer system as set forth in claim 14 wherein said first isocyanate component further comprises toluene diisocyanates, hexamethylene diisocyanates, isophorone diisocyanates, naphthalene diisocyanates, or combinations thereof and said second isocyanate component is selected from the group of diphenylmethane diisocyanates, polymeric diphenylmethane diisocyanates, toluene diisocyanates, hexamethylene diisocyanates, isophorone diisocyanates, naphthalene diisocyanates, or a combination thereof.

18. A method of preparing a prepolymer composition having a monomeric isocyanate content of no greater than about 10% by weight based on 100 parts by weight of the prepolymer composition, said method comprising the steps of:
I) reacting a monohydric isocyanate-reactive component with an excess of a first isocyanate component relative to the monohydric isocyanate-reactive component to form a diluent component having an excess of isocyanate functional groups, the first isocyanate component comprising polymeric diphenylmethane diisocyanate and monomeric isocyanates reactive with the monohydric isocyanate-reactive component and having at least two isocyanate functional groups reactive with the monohydric isocyanate-reactive component;
II) reacting, separate from step I), a polyol component having at least two hydroxyl functional groups with an excess of a second isocyanate component relative to the polyol component to form a prepolymer component also having an excess of isocyanate functional groups, the second isocyanate component having at least two isocyanate functional groups reactive with the polyol component; and
III) mixing, separate from steps I) and II), the diluent component and the prepolymer component to form the prepolymer composition.

19. A method as set forth in claim 18 further comprising the step of IV) providing a plasticizer component such that step III) is further defined as III) mixing, separate from steps I) and II), the diluent component, the prepolymer component, and the plasticizer component to form the prepolymer composition.

20. A method as set forth in claim 19 wherein the plasticizer component is non-functional such that the plasticizer component does not react with either of the diluent and prepolymer components.

21. A method as set forth in claim 18 wherein the prepolymer composition has a viscosity no greater than about 6,000 cP at 25° C. according to ASTM D2196.

22. A method as set forth in claim 18 wherein the prepolymer composition has a monomeric isocyanate content of no greater than about 7.5% by weight based on 100 parts by weight of the prepolymer composition.

23. A method as set forth in claim 22 wherein the prepolymer composition has a viscosity no greater than about 4,000 cP at 25° C. according to ASTM D2196.

24. A method as set forth in claim 18 wherein the diluent component has a monomeric isocyanate content no greater than about 10% by weight based on 100 parts by weight of the prepolymer diluent component.

25. A method as set forth in claim 18 wherein the prepolymer composition has an isocyanate functional group content of from about 1% to about 30% by weight based on 100 parts by weight of the prepolymer composition.

26. A method as set forth in claim 18 wherein the diluent component has a monomeric isocyanate content no greater than about 10% by weight based on 100 parts by weight of the prepolymer diluent component.

27. A method as set forth in claim 26 wherein the diluent component has an isocyanate functional group content of from about 1% to about 25% by weight based on 100 parts by weight of the diluent component.

28. A method as set forth in claim 27 wherein the diluent component has a viscosity no greater than about 3,000 cP at 25° C. according to ASTM D2196.

29. A method as set forth in claim 18 wherein the isocyanate-reactive component is an alcohol having from 1 to 20 carbon atoms.

30. A method as set forth in claim 29 wherein said first isocyanate component further comprises toluene diisocyanates, hexamethylene diisocyanates, isophorone diisocyanates, naphthalene diisocyanates, or combinations thereof and said second isocyanate component is selected from the group of diphenylmethane diisocyanates, polymeric diphenylmethane diisocyanates, toluene diisocyanates, hexamethylene diisocyanates, isophorone diisocyanates, naphthalene diisocyanates, or a combination thereof.

31. A method as set forth in claim 18 wherein the second isocyanate component comprises monomeric isocyanates reactive with the polyol component.

32. A prepolymer system as set forth in claim 1 wherein said second isocyanate component comprises polymeric diphenylmethane diisocyanate.

33. A prepolymer system as set forth in claim 2 wherein said plasticizer component is present in both of said diluent and prepolymer components such that said diluent component comprises the reaction product of said monohydric isocyanate-reactive component and said excess of said first isocyanate component in the presence of said plasticizer component, and such that said prepolymer component, which is different than and separate from said diluent component, comprises the reaction product of said polyol and said excess of said second isocyanate component in the presence of said plasticizer component.

34. A prepolymer system as set forth in claim 33 wherein each of said plasticizer components present in said diluent and prepolymer components are individually selected from the group of diisononyl adipate (DNA), triethyl phosphate (TEP), or a combination thereof.

35. A prepolymer system as set forth in claim 33 wherein said monohydric isocyanate-reactive component comprises an alcohol having from 1 to 12 carbon atoms.

36. A prepolymer system as set forth in claim 14 wherein said second isocyanate component comprises polymeric diphenylmethane diisocyanate.

37. A prepolymer system as set forth in claim 36 wherein said plasticizer component is present in both of said diluent and prepolymer components such that said diluent component comprises the reaction product of said monohydric isocyanate-reactive component and said excess of said first isocyanate component in the presence of said plasticizer component, and such that said prepolymer component, which is different than and separate from said diluent component, comprises the reaction product of said polyol and said excess of said second isocyanate component in the presence of said plasticizer component.

38. A prepolymer system as set forth in claim 37 wherein each of said plasticizer components present in said diluent and prepolymer components are individually selected from the group of diisononyl adipate (DNA), triethyl phosphate (TEP), or a combination thereof.

39. A prepolymer system as set forth in claim 37 wherein said monohydric isocyanate-reactive component comprises an alcohol having from 1 to 12 carbon atoms.

40. A prepolymer system as set forth in claim 1 wherein said prepolymer system is free of a polymeric species consisting of the reaction product of said monohydric isocyanate-reactive component, said polyol component, and said first isocyanate component and/or said second isocyanate component.

41. A prepolymer system as set forth in claim 40 wherein said diluent component I) consists essentially of the reaction product of said monohydric isocyanate-reactive component and said excess of said first isocyanate component, and wherein said prepolymer component II) consists essentially of the reaction product of said polyol component and said excess of said second isocyanate component.

42. A prepolymer system as set forth in claim 14 wherein said prepolymer system is free of a polymeric species consisting of the reaction product of said monohydric isocyanate-reactive component, said polyol component, and said first isocyanate component and/or said second isocyanate component.

43. A prepolymer system as set forth in claim 42 wherein said diluent component I) consists essentially of the reaction product of said monohydric isocyanate-reactive component and said excess of said first isocyanate component, and wherein said prepolymer component II) consists essentially of the reaction product of said polyol component and said excess of said second isocyanate component.

* * * * *